United States Patent
Schäfer

(10) Patent No.: US 7,661,496 B2
(45) Date of Patent: Feb. 16, 2010

(54) MOTOR VEHICLE COMPRISING A POP-UP HOOD

(75) Inventor: Joachim Schäfer, Darmstadt (DE)

(73) Assignee: GM Global Technology Operations, Inc., Detroit, MI (US)

(*) Notice: Subject to any disclaimer, the term of this patent is extended or adjusted under 35 U.S.C. 154(b) by 343 days.

(21) Appl. No.: 11/571,447

(22) PCT Filed: Jul. 1, 2005

(86) PCT No.: PCT/EP2005/007264
§ 371 (c)(1),
(2), (4) Date: Dec. 29, 2006

(87) PCT Pub. No.: WO2006/002989
PCT Pub. Date: Jan. 12, 2006

(65) Prior Publication Data
US 2008/0042461 A1    Feb. 21, 2008

(30) Foreign Application Priority Data
Jul. 3, 2004    (DE) .................. 10 2004 032 315

(51) Int. Cl.
*B62D 25/10*    (2006.01)
(52) U.S. Cl. .................. 180/69.2; 180/69.21; 180/274
(58) Field of Classification Search ............. 180/69.21, 180/274, 69.1, 281, 69.2, 271; 296/203.02, 296/189, 194, 187.04, 187.09
See application file for complete search history.

(56) References Cited

U.S. PATENT DOCUMENTS

| 4,015,870 | A | * | 4/1977 | Stcherbatcheff et al. ...... 293/32 |
| 4,093,290 | A | * | 6/1978 | Pearson ........................ 293/15 |
| 4,249,632 | A | * | 2/1981 | Lucchini et al. ............. 180/274 |
| 5,385,212 | A | * | 1/1995 | Cady et al. ................ 180/69.21 |
| 6,439,330 | B1 | * | 8/2002 | Paye ........................ 180/69.21 |
| 6,802,556 | B2 | * | 10/2004 | Mattsson et al. ....... 296/187.09 |
| 6,953,220 | B2 | * | 10/2005 | Takehara ............... 296/187.04 |
| 7,232,178 | B2 | * | 6/2007 | Neal et al. ............. 296/187.04 |

FOREIGN PATENT DOCUMENTS

| DE | 10152621 | 5/2003 |
| DE | 10159866 | 6/2003 |
| DE | 10204594 | 8/2003 |
| EP | 1361121 | 11/2003 |
| EP | 1393999 | 3/2004 |
| GB | 2382549 | 6/2003 |

* cited by examiner

*Primary Examiner*—Hau V Phan
(74) *Attorney, Agent, or Firm*—Ingrassia Fisher & Lorenz, P.C.

(57) ABSTRACT

Described here is a motor vehicle comprising a body, a bonnet and also at least one actuator which is supported on the body and engages with a first edge of the bonnet for the purposes of raising the first edge up to a stop means in the event of an impact. Prior to the striking of the stop means, the actuator accelerates the first edge to a speed which is such that the impulse received by the bonnet is sufficient to raise a second edge of the bonnet that is located opposite the first edge when the first edge strikes the stop means.

20 Claims, 4 Drawing Sheets

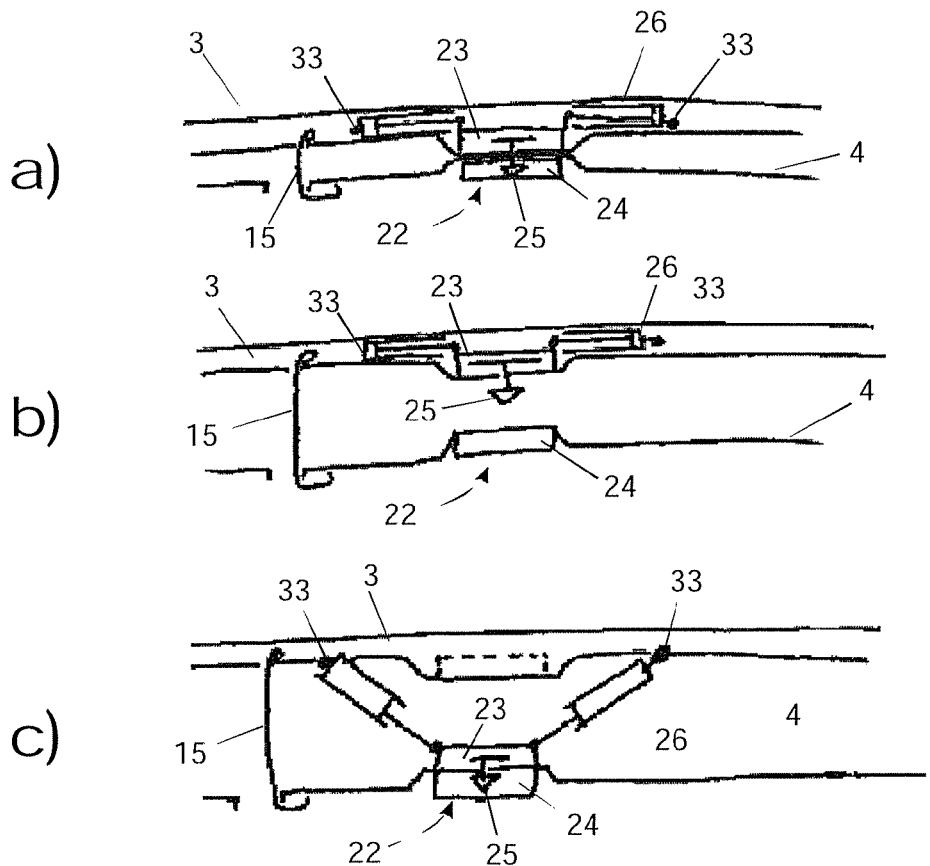
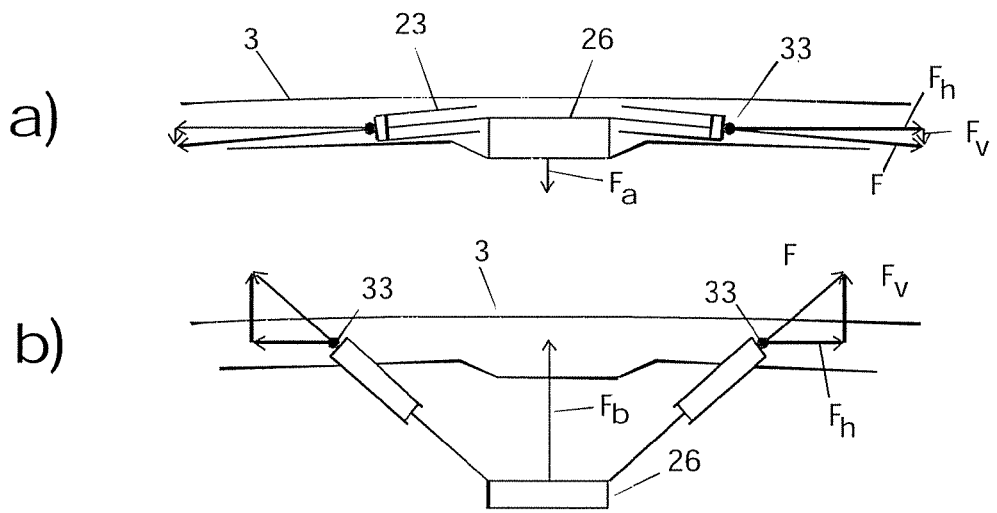
Fig. 3
Fig. 4

MOTOR VEHICLE COMPRISING A POP-UP HOOD

CROSS-REFERENCE TO RELATED APPLICATIONS

This application is a U.S. National-Stage entry under 35 U.S.C. §371 based on International Application No. PCT/EP2005/007264, filed Jul. 1, 2005, which was published under PCT Article 21(2) and which claims priority to German Application No. DE 10 2004 032 315.1, filed Jul. 3, 2004.

BACKGROUND

The present invention relates to a motor vehicle having a body and a bonnet of which a first edge thereof is adapted to be raised from a rest position into a limit position by an actuator that is supported on the body and a second edge thereof is supported on the body.

Increased legal requirements in regard to the protection of pedestrians in the event of accidents demand better accident prevention properties from modern motor vehicles. In order to decrease the consequences for a pedestrian and protect the pedestrian from severe injuries in the event of an impact especially of the pedestrian's head on the bonnet, it is desirable that the pedestrian or his head be slowed down as gradually as possible, for instance, by a deformation of the bonnet. There must however be a sufficiently large deformation space below the bonnet for such a deformation process. In modern motor vehicles, the front bonnet is mostly a bonnet over the engine whereby the distance between it and the engine amounts to just a few centimeters. As a deformation path for the bonnet however, this spacing is insufficient for effective protection of the pedestrian. For this reason, devices have been developed for automatically raising the bonnet in the event of an impact, such devices increasing the distance between the bonnet and the engine therebelow and thus extending the deformation path available to the bonnet.

The position at which the head of a person who has been run over strikes the bonnet depends on his body size. Consequently, in order to protect children and adults to an equal extent, the entire surface of the bonnet must be raised.

Actuators for raising the bonnet of the most diverse type are known. It is likewise known for both a rear and a front edge of the bonnet to be raised by means of actuators. A motor vehicle in which the front edge of the bonnet is adapted to be raised in its entirety without a front actuator is described in DE 101 52 621 A1. An actuator operable on the rear edge of the bonnet moves it obliquely upwardly and to the rear in the event of an impact. Due to the movement to the rear, the front edge is also displaced and thereby raised in a guideway in the body which runs obliquely upwardly and to the rear. The disadvantage of this arrangement however is that due to the oblique guidance arrangement, the path which the bonnet has to traverse in order to attain a given distance from the engine is significantly longer than that for a vertical lift so that a comparatively rapid actuator having a large stroke is needed.

The bonnet should reach its raised position as quickly as possible following the detection of an impact; insofar as possible it should already be in the raised position when the pedestrian hits it. To this end, the bonnet must be accelerated rapidly and accordingly powerful actuators are needed. However, if they are only triggered when the pedestrian has already touched the bonnet, then he will be subjected to an additional blow due to the raising thereof. The protective effect of the raising process can thus turn into the very opposite thereof.

SUMMARY

Consequently, the object of the present invention is to propose a motor vehicle having a raisable [or "pop-up"] bonnet [or "hood"] wherein the danger of injury to a pedestrian, who has been knocked over, due to the raising of the bonnet itself is reduced.

This object is achieved by the motor vehicle comprising a body and a bonnet of which a first edge is arranged to be raised from a rest position into a limit position by an actuator that is supported on the body and a second edge thereof is supported on the body, characterized in that a support point for the second edge on the body and the path followed during the process of raising the first edge from the rest position into the limit position are matched to one another in such a way that they permit a rise of the first edge without a simultaneous rise of the second edge, in that the second edge is arranged to be raised at least when the first edge is in the limit position, and in that the driving force of the actuator is of a magnitude that is sufficient to provide an impulse to the bonnet in the lifting direction until the limit position is reached, said impulse being sufficient to raise the second edge.

In completely general terms, the first edge may either be a front-end, front edge of the bonnet and the second edge a rear edge of the bonnet, or else the first edge may be representative of a rear edge of the bonnet and the second edge a front edge. However, because in the event of traffic accidents with pedestrians they are usually run over at the front, the first edge is preferably the rear edge of the bonnet and the second edge is the front edge of the bonnet.

The invention makes use of the realization that the energy which is introduced into the bonnet by the actuator during the rapid rise of the first edge and which is present in the form of potential and kinetic energy in the bonnet immediately after the raising of the first edge, i.e. the impulse absorbed by the bonnet, is also sufficient for raising the second edge, namely, in the simplest case, without the employment of further actuators. During the rapid explosive-like rise of the first edge, the bonnet is subjected to a resilient bending stress because those regions of the bonnet that are spaced from the first edge cannot instantly follow this rapid rise due to the mass inertia thereof and also the second edge is supported on the body. Consequently, due to the distortion of the bonnet, part of the work performed by the actuator is stored as potential energy in the form of a resilient deformation. When the first edge reaches the stop means, the deformation propagates in the form of a bending vibration to the second edge and jerks the second edge upwardly as soon as it arrives there.

A resilient deformation is not however a prerequisite for the raising of the second edge without an actuator. If one supposes that, ideally, the bonnet is rigid and is not deformed by the raising of the first edge, then, during the process of raising the first edge, its centre of gravity receives an impulse which is not destroyed when the first edge strikes its stop means, but rather, is effective as an upwardly directed force on the second edge.

In the simplest case, i.e. if the acceleration produced by the first actuator is high enough, the energy of the bending vibration and/or the impulse to the centre of gravity can be sufficient to raise the second edge up to a stop means too.

Since, for the raising of the second edge, no additional driving energy is fed into the bonnet, a pedestrian, who is already touching the bonnet when the raising of the second edge would normally begin, can block this rise by virtue of his own weight so that one is left with just the rise of the first edge. Additional injuries caused by the rapid rise of the second edge can thus be excluded.

Then, because no further actuator is necessary for the raising of the second edge apart from the actuator for the raising of the first edge, actuators for raising the second edge can be completely saved with the aid of the invention. In addition, a guide means is also not necessary. Thus, as a further advantageous effect of the invention, there is a cost advantage for the motor vehicle in accordance with the invention and a reduction in weight with respect to known motor vehicles having bonnets that are adapted to be raised at each end.

If the support point on the body for the second edge is fixed, the path followed during the process of lifting the first edge preferably runs substantially in the form of an arc of a circle around the support point. Since, in general, the path followed during the lifting process is short in comparison with the spacing of the edges, the circular arc can be approximated to a straight-line lifting path, especially if the support point has play parallel to the surface of the bonnet i.e. in the direction of a connecting line between the edges. The essential thing is that traction forces do not result directly from the movement of the first edge along the path followed during the lifting process, which said forces would force the second edge to rise before the first edge has reached the end of the lifting path as occurs in the construction in DE 101 52 621 A1. The greater the play of the support point parallel to the surface of the bonnet, then so much larger are the deviations of the lifting path from the ideal circular path that can be tolerated without the second edge being forced to rise prematurely.

A connection between the second edge and the body of the motor vehicle is severable in advantageous manner by a separating device which is adapted to be activated in the event of an impact so that no significant mechanical resistance has to be overcome for the raising of the second edge. This separating device can, in particular, be pyrotechnically or electromagnetically operated. The separating device does not have to supply any driving force for the purposes of raising the second edge. The separating device may also comprise a predetermined breaking point. The actuation of the separating device is then effected in simple manner by destroying the predetermined breaking point by using the energy introduced into the bonnet with the raising of the first edge.

The connection between the bonnet and the body can, for example, run via a bonnet lock by means of which the second edge and the body can be locked together. This would, for example, be the case for a bonnet which is attached in pivotal manner to the body at the first edge by means of a hinge so that the second edge can also be raised when the bonnet lock is unlocked without the onset of an impact.

It is preferable for the bonnet lock to comprise two parts that are adapted to be locked together, of which one is connected firmly to the bonnet or the body and the other is held on the body or the bonnet by means of the severable connection. In order for the second edge to be held loosely on the body in the event of an impact and such that it can be raised, the connection between the body or the bonnet and the part of the lock held thereby is severed by the separating device in the event of an impact.

Insofar as one of the parts of the bonnet lock is connected to the body via the severable connection, the parts of the bonnet lock that are still locked together after the severance of this connection are raised together therewith upon the raising of the second edge, whereas in the case where one of the parts is connected to the bonnet by the severable connection, the parts that are still locked together remain on the body during the raising of the second edge and the second edge is raised without these two parts.

In addition however, the second edge may be adapted to be raised only in the event of an impact. This is then the case for example, when the connection between the bonnet and the body is provided by at least one hinge with which the second edge is held on the body in pivotal manner. Such a hinge can be held on the bonnet or on the body by the severable connection. If the hinge is held on the body by the severable connection and if the connection is severed in the event of impact with a pedestrian, then the hinge is raised together with the rising second edge. If, by contrast, the hinge is held on the bonnet by the connection, then it remains with the body after the release of the connection in the event of an impact, and the second edge is raised without the hinge. A hinge, which comprises two hinge parts that are connected together in articulated manner by means of a shaft which is adapted to be withdrawn by the separating device, permits of a further variant wherein a first of the hinge parts is firmly connected to the body and the second of the hinge parts is firmly connected to the bonnet. In such a case, the second edge is lifted with only the second hinge part that is attached to the bonnet, whilst the first hinge part remains with the body.

After the raising of the second edge in the event of impact with a pedestrian, it is desirable for the second edge to remain in the raised state so that it is particularly preferred that at least one support means be provided for supporting the second edge in the raised state. It is particularly preferred that this support means be resilient to the body impinging on the bonnet in the event of an impact in order to absorb the impact force of the body. Such a support means can comprise resiliently or flexibly deformable elements for example. Examples of such a support means are a gas spring or a gas bag.

Insofar as the motor vehicle comprises a bonnet lock having two mutually lockable parts as described above, the support means can engage on the one hand with the part that is normally held on the body by the severable connection and on the other hand with the body, or, the support means can engage on the one hand with the part that is held on the bonnet by the severable connection and on the other hand with the bonnet. By contrast, if the hinge described above is available then if the hinge is held on the body by the severable connection, the support means can engage on the one hand with the hinge and on the other hand with the body, or, if the hinge is held on the bonnet by the severable connection, then the support means can engage with the hinge on the one hand and with the bonnet on the other.

The raising of the second edge can be advantageously assisted by means of at least one second actuator which engages with the second edge and which is set up to produce on the second edge a force driving it away from the body if the second edge is located at least at a given activation height above a rest position in which the second edge is held when the bonnet is closed. As described above, the second edge is raised up to the given activation height by virtue of the impulse received by the bonnet. If the second edge goes beyond the activation height, then the first force of the second actuator sets in and assists the further rise thereof. If, however, the raising process is already impeded from the outset by a pedestrian lying on the bonnet, the second actuator remains ineffective.

Hereby, the second actuator can be set up to produce a force on the second edge that is directed towards the body if the second edge is located below the given activation height, whereby this force should be small compared with the driving force directed away from the body in the activated state. The force directed towards the body is useful in order to facilitate the severance of the severable connection.

The aforesaid forces can be produced in a simple manner by two second actuators which are arranged in a pivotal manner and, at the activation height, exert exactly anti-parallel forces, which are transverse to the direction of motion of the second edge, on said edge and the body.

It is quite especially preferred hereby that the support means be identical to the second actuator.

BRIEF DESCRIPTION OF THE DRAWINGS

The present invention will hereinafter be described in conjunction with the following drawing figures, wherein like numerals denote like elements, and FIGS. 1a)-c) show different phases during the process of raising a bonnet;

FIGS. 3a)-c) show schematic illustrations of a second bonnet lock with means for supporting the front edge of the bonnet in the raised state;

FIGS. 4a)-b) provide an illustration of the forces effective at the coupling points of the support means;

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
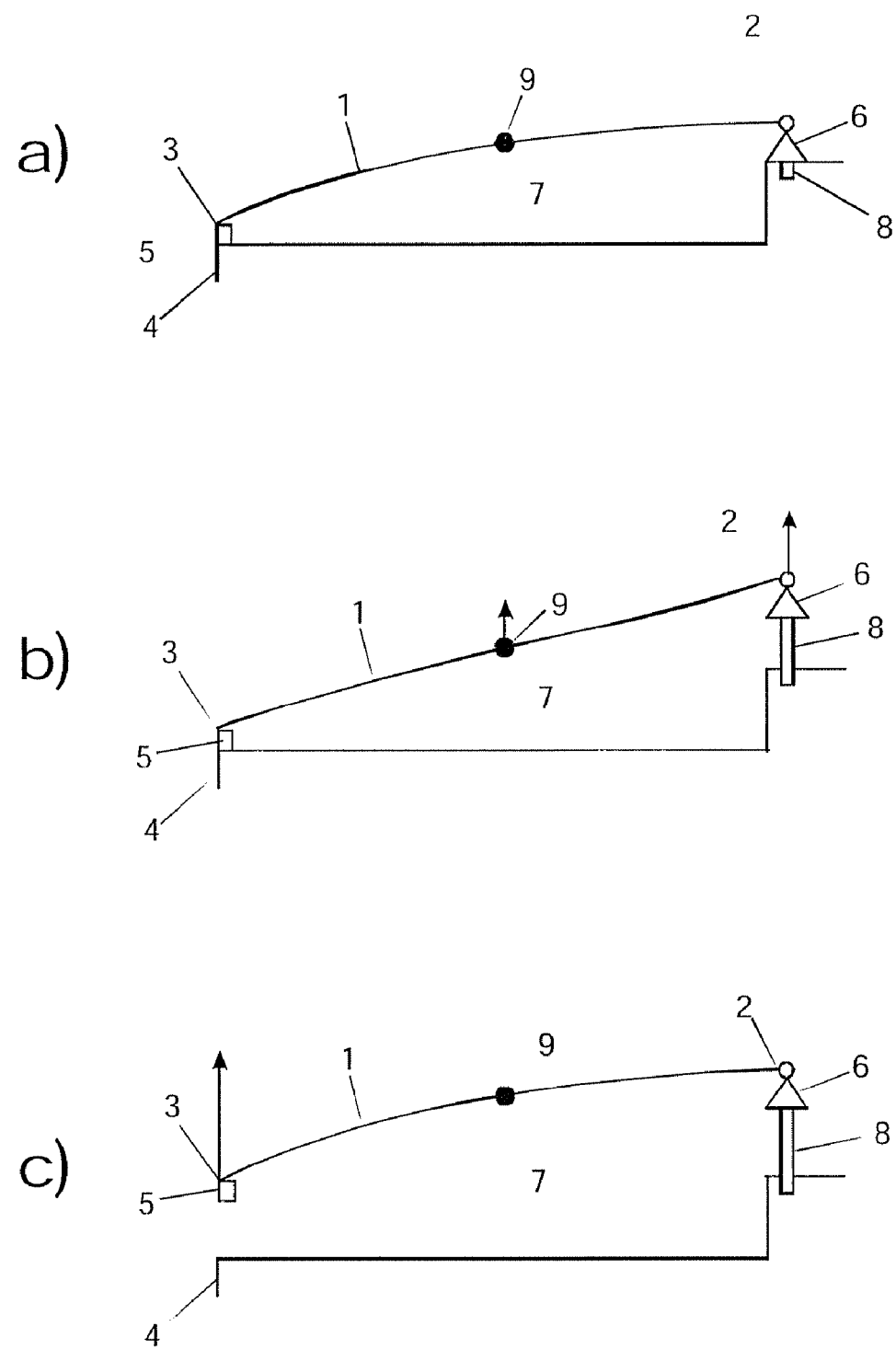

In order to clarify the underlying principle of the invention, a simplified cross section through a frontal region of a motor vehicle in accordance with the invention is shown in FIG. 1a). A frontally located bonnet 1 comprises a rear edge 2 and a front edge 3. The front edge 3 of the bonnet 1 is attached to a body 4 of the motor vehicle by means of a lock 5. The rear edge 2 is articulated to the body 4 by a hinge 6. The bonnet 1 is pivotal in the hinge 6 in the usual manner and can be lifted up after the lock 5 has been unlocked. In normal operation of the motor vehicle, the bonnet 1 is pushed down as shown in FIG. 1a) and covers an engine compartment 7 of the motor vehicle, whereby the lock 5 is then locked. An engine block that is not visible in the Figure is arranged in the engine compartment 7. An actuator 8 is provided near the hinge 6 for the purposes of raising the hinge 6 or the rear edge 2. Finally, the centre of gravity 9 of the bonnet 1 has been indicated.

In the event of an impact of a pedestrian on the bonnet, the actuator 8 then raises the rear edge 2 of the bonnet 1 together with the hinge 6 up to a stop means. At the same time, the lock 5 is unlocked so that the front edge 3 is then just loosely held. This is described in more detail hereinbelow. FIG. 1b) shows the situation during the raising of the hinge 6. An arrow depicts the upward motion of the hinge 6 or the rear edge 2. Hereby, the actuator 8 exerts a force on the rear edge 2 via the hinge 6 and accelerates them both. The centre of gravity 9 cannot follow up immediately due to the mass inertia of the rapid upward movement of the rear edge 2 so that the bonnet 1 is bent in a resilient manner. It is only when the bending vibration has propagated to the centre of gravity 9 that the latter begins to accelerate upwardly as is indicated by a smaller arrow.

The upward motion of the rear edge 2 of the bonnet 1 is stopped when the actuator 8 reaches the stop means. By contrast, the centre of gravity 9 continues its upward movement because of the mass inertia. The bending stress developed in the bonnet thereby diminishes and accelerates the front portion of the bonnet upwardly. Because the front edge 3 is only resting loosely on the body 4, it too is raised. The elasticity of the bonnet and hence the speed of propagation of the bending vibration therein are defined by the construction of the bonnet 1 such that, upon the detection of an impact with a pedestrian, the time required for the front edge 3 to reach an upper stop means is sufficient to raise the bonnet 1 completely before the pedestrian hits the bonnet 1.

FIG. 1c) shows the situation after the raising of the front edge 3. The actuator 8 has traveled up to the stop means, the stress in the bonnet 1 has been relieved, the centre of gravity 9 is at rest and the front edge 3 is raised. Thanks to the raised front edge 3, there is also sufficient deformation space between the bonnet 1 and the engine block arranged in the engine compartment 7 in the frontal region of the bonnet 1 so that the danger of injury to a pedestrian, particularly in the event of an impact involving a child hitting the frontal region of the bonnet 1, is substantially reduced. Even if the front edge 3 is not supported in the raised state and immediately swings back down again after having been raised, there is a noticeably reduced danger of injury to the pedestrian because of the very short time interval between the raising of the front edge 3 and the impact of the pedestrian on the bonnet 1.

Figure 2:
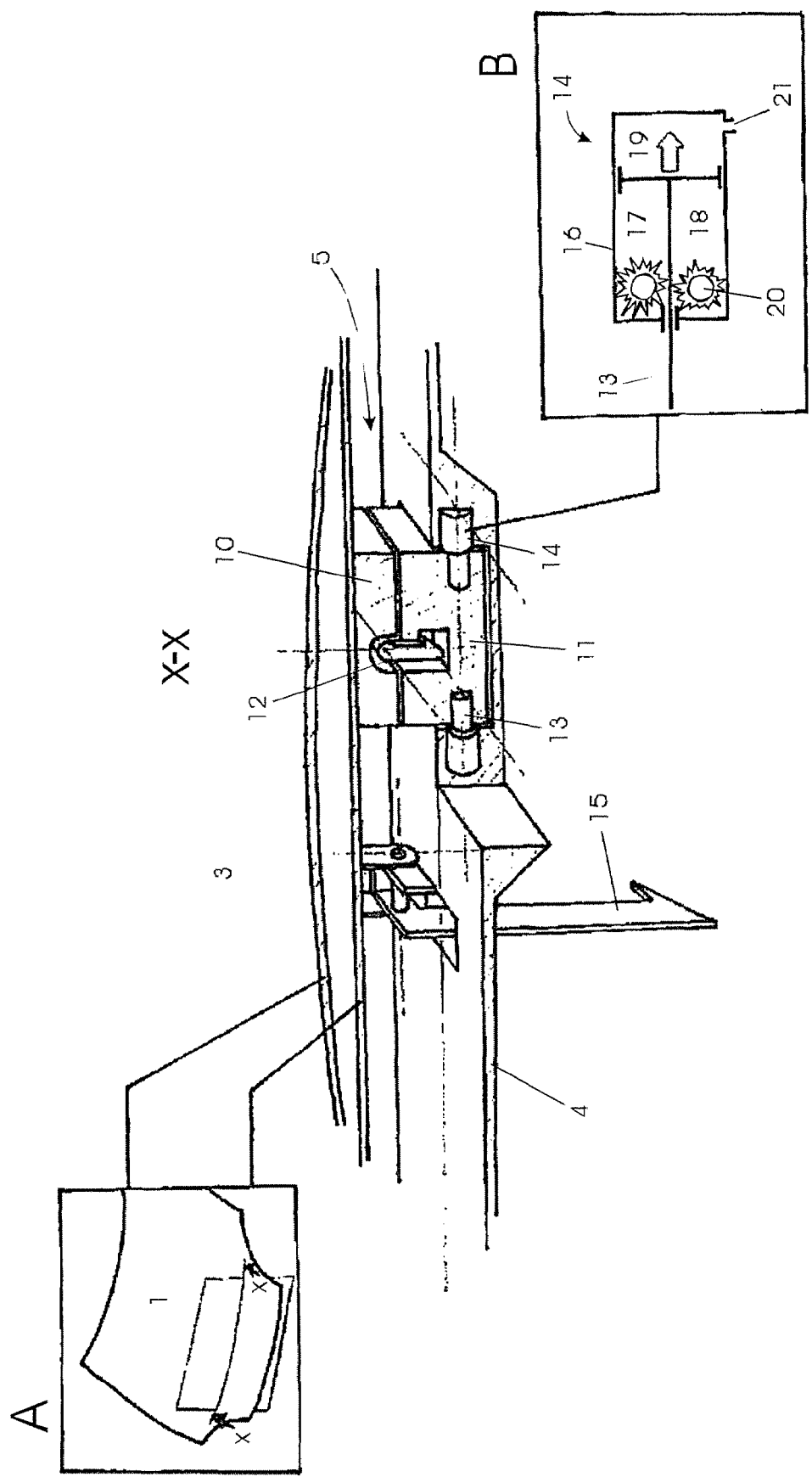
FIG. 2 provides a schematic illustration of a first bonnet lock.

FIG. 2a shows one possible embodiment for the lock 5 of the motor vehicle in accordance with the invention which will permit the front edge 3 to be held loosely in the event of an impact so that the front edge 3 of the bonnet 1 is adapted to be raised in accordance with the invention without an actuator. A section through the bonnet 1 is indicated In the upper left block A of FIG. 2, this being illustrated on an enlarged scale in FIG. 2 in the form of a view in the direction of the arrows X-X. One can see a part of the bonnet 1 as well as the body 4. The lock 5 comprises an upper part 10 and a lower part 11 which are adapted to be locked together by a hook 12 that is articulated to the upper part 10. In the locked state of the lock 5 illustrated here, the hook 12 is hooked on to the lower part 11. The upper part 10 is firmly connected to the front edge 3 of the bonnet 1. The lower part 11 is accommodated in a recess in the body 4 and is held on the body 4 by means of connecting pins 13, whereby a pyrotechnic device 14 that is let into the body 4 engages with each of the connecting pins 13. A catch hook 15 that is articulated to the bonnet 1 penetrates through a cut-out in the body 4 so that it hooks onto the edge of the cut-out when the front edge 3 is raised.

A schematic section through one of the pyrotechnic devices 14 is illustrated in the detail B at the lower right of the Figure. The pyrotechnic device 14 basically comprises a hollow cylinder 16 having a piston 17 which is moveable therein and divides the interior of the cylinder 16 into an explosion chamber 18 and an exhaust chamber 19. One of the connecting pins 13 penetrates through the cylinder 16 at the explosion chamber 18 side and projects into the latter. The end thereof projecting into the explosion chamber 18 is connected to the piston 17. Propellants 20 are arranged in the explosion chamber 18. Finally, the cylinder 16 has a nozzle 21 on the side of the exhaust chamber 19.

In the normal operating state of the motor vehicle, the lock 5 is locked as shown in FIG. 2. The hook 12 is hooked onto the lower part 11, the connecting pins 13 are inserted into the lower part 11 whereby the latter is held on the body 4. In the event of an impact whereby the actuator 8 raises the rear edge 2 of the bonnet 1, the propellants 20 in the pyrotechnic devices 14 are ignited at the same time, whereby excess pressure develops in the explosion chamber 18 so that the piston 17 is displaced within the cylinder 16 in the direction of the arrow. Hereby, the nozzle 21 ensures that the air present in the exhaust chamber 19 can escape so that the piston 17 can move without encountering any significant resistance. Due to the displacement of the piston 17, the connecting pin 13 connected thereto is pulled out of the lower part 11. Although the lock 5 is still locked, i.e. although the hook 12 is still hooked onto the lower part 11, the entire lock 5 and thus the front edge 3 of the bonnet 1 are now only resting loosely on the body 4 and are merely connected thereto by virtue of the frictional engagement between the sides of the lower part 11 and a recess accommodating it in the body 4. This comparatively weak frictional engagement is overcome however, as soon as the bending stress developed in the bonnet 1 by the lifting of the rear edge 2 diminishes. The forces then occurring at the front edge 3 finally release the lock 5 from the body 4 and raise the front edge 3. Hereby however, the rise of the front edge 3 is limited by the catch hook 15 which prevents excessive length of travel of the front edge 3. Namely, if the front edge 3 were to be raised too high, the danger exists that a pedestrian would hit the front edge 3 directly instead of the surface of the bonnet 1 and be injured thereby.

In FIG. 2, the lower part 11 of the lock 5 is attached to the body 4 by means of the connecting pins 13.

As an alternative thereto, it is also possible, in the same way, to attach the upper part 10 to the bonnet 1 by means of connecting pins 13 and pyrotechnic devices 14. In such a case, the connection of the upper part 10 to the bonnet 1 is severed for the purposes of lifting the front edge 3 so that the front edge 3 is then raised without the lock 5 which now remains attached to the body 4. As an alternative thereto, it is also possible to firmly connect the upper part 10 and the lower part 11 respectively to the bonnet 1 and the body 4 and instead, to make provision for the lock 5 to be disengaged in the event of an impact. To this end, the lock 5 can, for example, comprise an appropriate pyrotechnic actuator which releases the hooked connection between the hook 12 and the lower part 11. In such a case, the upper part 10 attached to the bonnet 1 is raised with the front edge 3, whilst the lower part 11 remains on the body 4.

It is self-evident that the pyrotechnic device 14 can be replaced by any other type of device which will ensure separation of the lower part 11 from the body 4 in the event of an impact. For example, such a device could be a known electromagnetically activated device which withdraws the connecting pins 13 from the lower part 11 in like manner to the pyrotechnic device 14 described above, but one which however, is propelled electromagnetically rather than pyrotechnically. In a further alternative embodiment, the connecting pins 13 comprise respective predetermined breaking points, without additional devices being provided for withdrawing the connecting pins 13. In the event of an impact, the connecting pins 13 are destroyed by the high forces, which destroys [sic] at the front edge 3 due to the deformation of the body caused by an impact or at the latest by the jarring when the rear edge strikes its upper stop means, and the lower part 11 of the lock 5 is thereby separated from the body 4.

A motor vehicle having a lock 22 which corresponds to the lock 5 described above and which comprises an upper part 23, a lower part 24 and a hook 25 but wherein the upper part 23 is released from the bonnet 1 in the event of an impact can be seen schematically in FIGS. 3a) to 3c) from a perspective corresponding to FIG. 2. Moreover, apart from the lock 22 and the catch hook 15, the motor vehicle illustrated in FIGS. 3a) to 3c) comprises two gas springs 26 which are articulated to respective coupling points 33 first on the upper part 23 and then on the bonnet 1. The forces effective on the coupling points 33 will be discussed further below with reference to FIGS. 4a) and 4b).

FIG. 3a) shows the state during normal operation of the motor vehicle. The lock 22 is locked, the upper part 23 is connected to the lower part 24 in that the hook 25 is hooked thereon. The inactive gas springs 26 are withdrawn and are accommodated in space-saving manner in recesses in the bonnet 1.

FIG. 3b) shows the bonnet 1 in the opened state, likewise during normal operation of the motor vehicle. The upper part 23 and the lower part 24 are unlocked and released from one another, whereby the upper part 23 is still connected to the bonnet 1 and the lower part 24 to the body 4. The gas springs 28 remain accommodated inactively in the recesses in the bonnet 1.

By contrast, FIG. 3c) shows the situation upon the occurrence of an impact with a pedestrian wherein the front edge 3 is raised. The connection between the upper part 23 and the bonnet 1 has been released so that the front edge 3 has been raised without the upper part 23. The stroke length of the path traversable by the front edge 3 is limited by the catch hook 15. Because the gas springs 26 are articulated on the one hand to the upper part 26 and on the other hand to the bonnet 1 and the front edge 3 moves upwardly, whereas the upper part 23 released from the bonnet 1 remains locked to the lower part 24 and hence does not implement an upward movement, the gas springs 26 are pivoted out from their recesses. After the raising of the front edge 3, the gas springs 26 firstly provide a supporting means for the front edge 3 so that this remains in the raised position after having been raised, whilst on the other hand they are effective to produce additional absorption for the impact force of a pedestrian striking the bonnet 1.

FIG. 4a) clarifies the forces effective on the coupling points 33 with a closed bonnet 1 immediately after the release of the connection between the upper part 23 and the bonnet 1 in the event of an impact. Immediately after the release of the connection, the bonnet 1 adopts the rest position illustrated in FIG. 3a). The gas springs 26 are buckled and each produces a force F on its respective coupling point 33 since they each form a small angle with the horizontal. In FIG. 4a), the forces F have been broken down into their horizontal components Fh and their vertical components Fv. Whereas the two oppositely directed components Fh cancel themselves out, the vertical components Fv are directed in the same direction and are added to form the resulting force Fr=Fr0 which is effective in the direction of the body 4. It keeps the upper part 23 pressed against the bonnet. If, due to the bending stress therein, the bonnet prepares to raise the front edge 3 then this force Fr0 is initially effective against such a rise. However, the force Fr0 is easily overcome by the bending stress.

Figure 5:
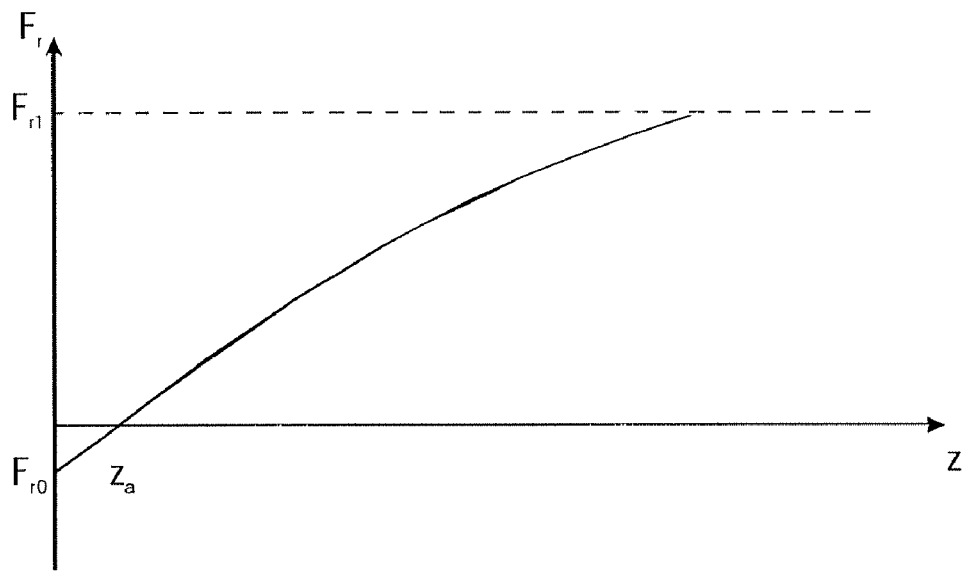
FIG. 5 shows the dependence of the resulting force effective on the second edge at the height of the edge.

After the onset of the stroke-like movement of the front edge 3, the gas springs 26 are initially still buckled. Hereby, as is depicted in the diagram of FIG. 5, the amount of the resulting force Fr decreases continuously until an activation height za is reached at which the forces F of the two gas springs 26 are exactly anti-parallel. Further raising of the front edge 3 leads to a reversal in the direction of the resulting force Fr which is now directed upwardly away from the body 4 and assists the upward movement of the front edge 3 as is depicted in FIG. 4b) wherein the forces F exerted by the gas springs 26 on the coupling points 33 are broken down into horizontal components Fh and vertical components Fv as was done in FIG. 4a). In the raised state of the front edge 3, the gas springs 26 are effective with maximum resulting force Fr1 on the front edge 3, the absolute value of Fr1 being greater than the absolute value of the maximum force Fr0. By virtue of this arrangement of symmetrically arranged gas springs 26, the effect is achieved that the rise of the front edge 3 is indeed assisted by the gas springs 26, but the front edge 3 does not shoot up in explosive manner. Above all however, any upward movement is suppressed if the pedestrian has already struck the bonnet 1 before the beginning of the raising process because the energy in the bonnet is not then sufficient for reaching the activation height at which the gas springs 26 would then drive the bonnet up further.

Alternatively, instead of the gas springs 26 shown, any other desired means could also be employed for supporting the front edge 3 in the raised position, whereby such means absorb the impact force of a pedestrian by resilient or plastic deformation and support the raised front edge 3. Suitable means would, among other things for example, be bendable elements such as metal or plastic bars which can be formed so as to fold in and out in like manner to the gas springs 26 described above. Other means for supporting the raised front edge 3 which also provide an absorbing effect for pedestrians striking the bonnet 1 are, for example, foamed bodies or a gas bag which is inflated when the front edge 3 is raised in the event of an impact.

Figure 6:
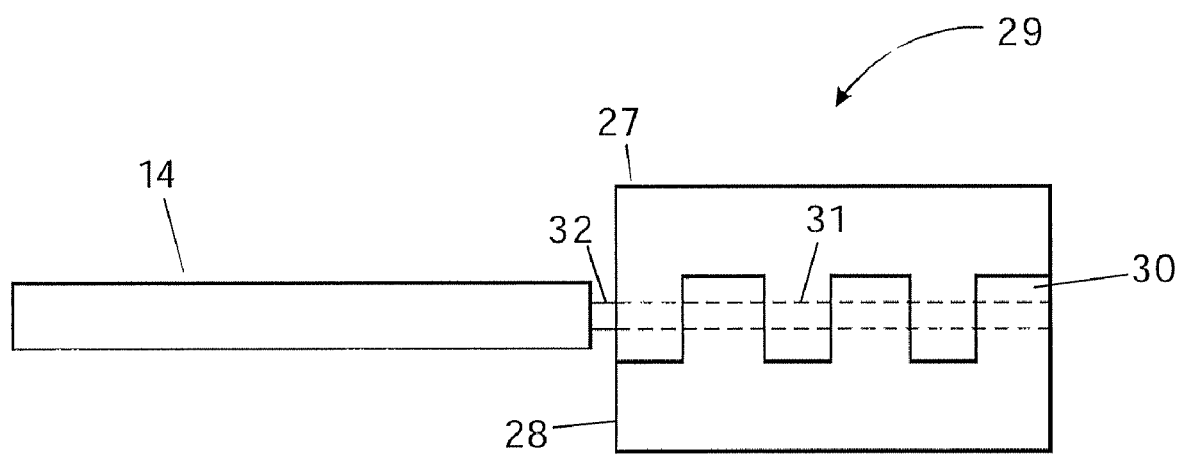
FIG. 6 provides a schematic illustration of a hinge.

In the exemplary embodiments described, the upper parts 10, 23 and the appertaining lower parts 11, 24 are parts of locks 5, 22. However, it is also conceivable for a hinge 29 to comprise an upper hinge part 27 and a lower hinge part 28, as is shown in FIG. 6 in simplified manner, whereby the bonnet 1 is attached to the body 4 by the hinge 29 in pivotal manner at the second edge 3. In such a case, a lock or other suitable locking device is usually provided at the first edge 2 and said lock is raised by the actuator 8 together with the first edge 2 in the event of an impact. The two hinge parts 27, 28 are connected together in pivotal manner by means of a single continuous shaft 32 which is inserted into respective inter-engaging comb-like projections 30 of the hinge parts 27, 28 which incorporate continuous openings 31. As was the case for the connecting pins 13 described above, the ends of the shaft 32 protruding from the projections 30 are connected to a respective pyrotechnic device 14.

In the event of impact with a pedestrian, the propellant 20 of the pyrotechnic device 14 is ignited and the shaft 32 is pulled out of the openings 31 in like manner to the connecting pins 13 being withdrawn from the lower part 11 in the previous example. The two hinge parts 27, 28 are thereby released from one another.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A motor vehicle comprising a body and a bonnet of which a first edge is arranged to be raised from a rest position into a limit position by an actuator that is supported on the body and a second edge thereof is supported on the body, characterized in that a support point for the second edge on the body and the path followed during the process of raising the first edge from the rest position into the limit position are matched to one another in such a way that they permit a rise of the first edge without a simultaneous rise of the second edge, in that the second edge is arranged to be raised at least when the first edge is in the limit position, and in that the driving force of the actuator is of a magnitude that is sufficient to provide an impulse to the bonnet in the lifting direction until the limit position is reached, said impulse being sufficient to raise the second edge.

2. A motor vehicle in accordance with claim 1, characterized in that the support point for the second edge and the path followed during the lifting process are matched to one another in that the path followed during the lifting process runs substantially in the form of an arc of a circle about the fixed support point on the body.

3. A motor vehicle in accordance with claim 1, characterized in that the support point for the second edge exhibits play parallel to the surface of the bonnet.

4. A motor vehicle in accordance with claim 1, characterized by a separating device that is arranged to be activated in the event of a pedestrian impact for the purposes of severing a connection between the body and the second edge.

5. A motor vehicle in accordance with claim 4, characterized in that the separating device is actuated pyrotechnically or electromagnetically, or in that it comprises at least one element incorporating a predetermined breaking point.

6. A motor vehicle in accordance with claim 1, characterized by a bonnet lock by means of which the second edge is held on the body.

7. A motor vehicle in accordance with claim 6, characterized in that the bonnet lock is arranged to be unlocked by the separating device.

8. A motor vehicle in accordance with claim 6, characterized in that the bonnet lock comprise two parts that are arranged to be locked together, of which one is connected firmly to the bonnet or the body and the other is held on the body or the bonnet respectively by means of the severable connection.

9. A motor vehicle in accordance with claim 1, characterized by at least one hinge with which the second edge is held on the body in pivotal manner.

10. A motor vehicle in accordance claim 9, characterized in that the hinge is held either on the body or on the bonnet by means of the severable connection.

11. A motor vehicle in accordance claim 9, characterized in that the hinge comprises two hinge parts that are connected together in articulated manner by means of a shaft which is arranged to be withdrawn by the separating device, wherein a first of the hinge parts, is firmly connected to the body and the second of the hinge parts is firmly connected to the bonnet.

12. A motor vehicle in accordance with claim 1, characterized by at least one support means for supporting the second edge in a raised position.

13. A motor vehicle in accordance with claim 12, characterized in that the support means is resilient when a body strikes the bonnet in the event of an impact.

14. A motor vehicle in accordance with claim 13, characterized in that the support means is a gas spring or a gas bag.

15. A motor vehicle in accordance with claim 12, characterized in that the support means engages on the one hand with the part that is held on the body by the connection and on the other hand with the body, or, in that the support means engages on the one hand with the part that is held on the bonnet by the connection and on the other hand with the bonnet.

16. A motor vehicle in accordance with claim 12, characterized in that in the case where a hinge is held on the body by the connection, the support means is articulated to the hinge on the one hand and to the body on the other, or, in that in the case where the hinge is held on the bonnet by the connection, the support means is articulated to the hinge on the one hand and to the bonnet on the other.

17. A motor vehicle in accordance with claim 12, characterized in that the support means is identical to a second actuator.

18. A motor vehicle in accordance with claim 1, characterized in that at least one second actuator engages with the second edge, said second actuator being arranged to produce a force ($F_r$) on the second edge which drives the second edge away from the body if the second edge is located at least at a predetermined activation height ($z_a$) above a rest position which the second edge occupies when the bonnet is closed.

19. A motor vehicle in accordance with claim 17, characterized in that the second actuator is arranged to produce on the second edge a force ($F_r$) which is directed towards the body if the second edge is located below the predetermined activation height, whereby the greatest possible absolute value ($|F_{r1}|$) of the force directed towards the body is smaller than the greatest possible absolute value ($|F_{r2}|$) of the force directed away from the body.

20. A motor vehicle in accordance with claim 18, characterized by two second actuators arranged in mirror-symmetrical manner which, in the rest position, produce forces having mutually opposed components of force that are perpendicular to the raising direction of the second edge.

* * * * *

UNITED STATES PATENT AND TRADEMARK OFFICE
CERTIFICATE OF CORRECTION

PATENT NO. : 7,661,496 B2
APPLICATION NO. : 11/571447
DATED : February 16, 2010
INVENTOR(S) : Joachim Schäfer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 392 days.

Signed and Sealed this

Thirtieth Day of November, 2010

David J. Kappos
*Director of the United States Patent and Trademark Office*